Dec. 31, 1957 N. E. MANOS 2,818,274
VEHICLE SAFETY BAR FOR PREVENTING PIVOTED
SEAT BACK AGAINST FOLDING
Filed Nov. 2, 1955
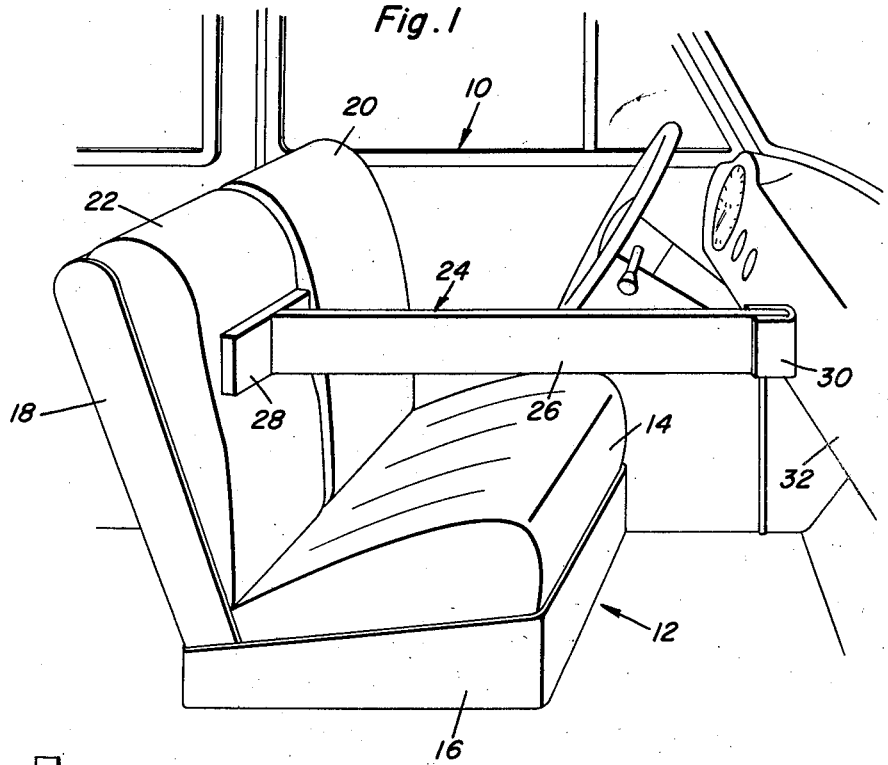
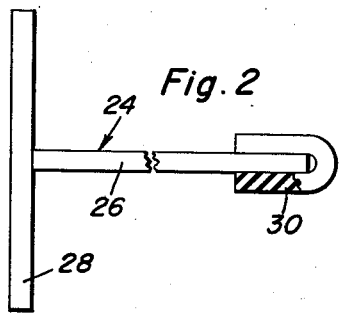
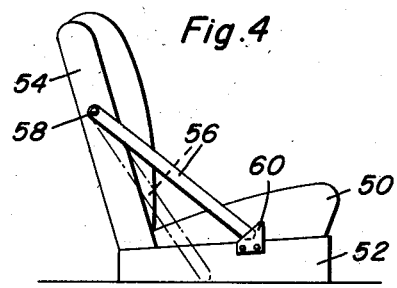
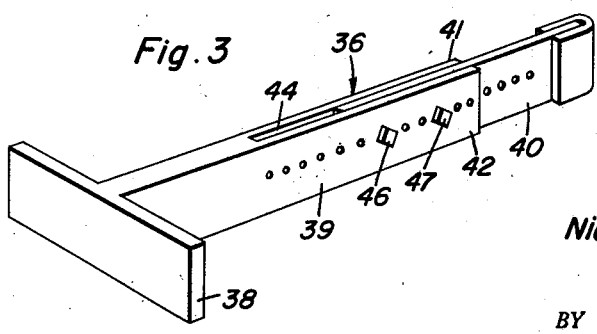
Nicholas E. Manos
INVENTOR.
BY
Attorneys

2,818,274

VEHICLE SAFETY BAR FOR PREVENTING PIVOTED SEAT BACK AGAINST FOLDING

Nicholas E. Manos, Chevy Chase, Md.

Application November 2, 1955, Serial No. 544,431

5 Claims. (Cl. 280—150)

This invention relates to improvements in safety devices and particularly to safety devices for use on the interior of automotive vehicles.

An object of the present invention is to provide a device for preventing the back rest of the front seat of a motor vehicle from being thrown forward due to high decelerations or impact, whereby passengers, particularly children in the rear part of the motor vehicle are not thrown forward over the back rest.

A further object of the invention is to provide an extremely simple safety device which is easily attached and removed from the back rest of the front seat of the vehicle, the safety device being extremely sturdy and held in place in part by the pressure applied by the back rest on the back rest contacting part of the device.

A further object of the invention is to provide a safety device as described previously which is adjustable so that it may be used regardless of the setting of the front seat in the motor vehicle.

A further object of the invention is to provide a vehicle safety device for preventing the back rest of the front seat in the vehicle from being thrown forward with attendant increase in the possibility of injury to the passengers in the vehicle, the safety device comprising a bar which is pivoted to the back rest and releasably engageable with a stop that is carried by a convenient portion of the motor vehicle, such as the seat frame or metallic trim or kick board at the lower part of the front seat and on one side thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a fragmentary part of the interior of an ordinary motor vehicle showing the principles of the invention applied thereto;

Figure 2 is a top view of the safety device, portions broken away in section;

Figure 3 is a perspective view of an adjustable model of the safety device; and

Figure 4 is a side view of a modified form of the invention.

In Figure 1, I have illustrated an ordinary vehicle 10 which has among other structures a front seat 12 consisting of a lower seat cushion 14 around which there is a kick board 16. The back rest 18 is made in two sections 20 and 22 as found in the majority of two-door automobiles. Back rests 20 and 22 are individually and independently pivotable in order to have access to the rear compartment of the motor vehicle.

The safety device 24 in Figure 1 and Figure 2 consists of a bar 26, shown in this instance as being rectangular in cross-section. At one end of the bar there is a cross member 28 which presents a plane surface to the front surface of back rest 22. At the opposite end of the bar 26 there is a pad 30, formed preferably by a sheet of foam rubber, plastic or other soft material that is cemented or otherwise fixed in place after being folded around the end of bar 26. The pad 30 functions as a cushion when placed against the dashboard 32 of the motor vehicle 10. Bar 26 is of such length that cross member 28 is forced against the front surface of the back rest 22 whereby the springs in the back rest exert a force thereon supporting the safety device with the cushion 30 frictionally contacting dashboard 32.

The embodiment of Figure 3 consists of a bar 36 having a cross member 38 at one end which is identical to the cross member 28. The bar is made of two pieces 39 and 40, the piece 39 including two plates 41 and 42 that are parallel to each other but spaced in order to form a pocket 44 therebetween. The piece 40 is a flat strip which fits in pocket 44. A number of apertures are formed in the plates 41 and 42 as well as in the piece 40. Bolts 46 and 47 are passed through aligned apertures in the plates 41 and 42 and also in the piece 40. In this way the piece 40 may be adjusted with respect to the piece 39 and the bolts 46 and 47 placed in the aligned apertures in order to hold the selected, adjusted position of the bar 36. In this way the safety device may be adjusted to suit the particular vehicle in which it is used. In addition, different vehicle operators desire to have the seat in different positions with respect to the steering wheel and the other controls. Accordingly, adjustment of the length of the safety device 36 may be made to compensate for the varying space between the back rest 18 and the dashboard 32.

Attention is now invited to Figure 4 where the seat has a lower cushion 50 around which there is a frame including kick board 52. The back rest 54 is similar to the back rest 18. In order to prevent it from being thrown forward there is a bar 56 having an upper end pivoted as at 58 to the side of the back rest 54. The lower end of the bar 56 is engageable with a stop 60, the latter consisting of a flat plate riveted, bolted or otherwise fixed to the kick board 52 and having a pocket therein which confronts the end of bar 56. When not in use, the bar 56 may be lifted slightly to release it from engagement with the pocket in the stop 60 and then lowered past the stop to the dotted line position. Alternatively, the bar 56 may be lifted so that the back rest 54 may be pivoted forwardly in order to allow ingress and egress from the rear compartment of the motor vehicle.

In operation of the form of the invention shown in Figure 1 or in Figure 3, after the desired length (for Figure 3) of safety device is established, it is inserted between the dashboard 32 and the front surface of the back rest 22. Cushion 30 bears tightly against the dashboard 32 while the cross member 28 bears tightly against the yielding opposition of the springs and other resilient padding in the back rest. Upon impact or sudden stopping such as to cause a considerable deceleration, the back rest 18 will not move forward because it is prevented from so doing by the action of the safety device 24. Accordingly, passengers in the rear compartment of the vehicle are not thrown forwardly while passengers who may be in the front compartment of the vehicle are not pushed forward against the dashboard or windshield by the on-rushing passengers from the rear compartment.

In the embodiment of Figure 4, after the passengers are seated, the bar 56 is pivoted to such position that the lower end thereof comes to rest in the pocket of the stop 60. This functions in a manner identical to the functioning of the safety devices 24 and 36. That is, the bar 56 prevents the back rest 54 from being swung forwardly in response to impact or other decelerations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motor vehicle dashboard, a seat and a resilient back rest mounted pivotally and constituting a part of the seat, a safety device comprising a bar, a cross member at one end of said bar, a cushion at the opposite end of said bar adapted to come to rest upon the dashboard of the vehicle, said bar being of a length slightly in excess of the distance between the dashboard and said back rest of the vehicle seat, said cross member being pressed against the front surface of the back rest of the vehicle seat so that the inherent resiliency in said back rest presses against said cross member holding it in place.

2. The safety device of claim 1, wherein said bar is extensible, including two parts, and means operatively connected with said two parts for releasably holding said two parts in selected, adjusted positions as to length.

3. In combination with a motor vehicle pivoted backrest and a vehicle part in front of the backrest, a safety device including a bar, means at one end of said bar to contact the backrest, means at the other end of said bar to contact said part of the motor vehicle in advance of the seat and backrest whereby said bar forms a brace preventing the pivotal movement of said backrest when said bar is of a length equal to the distance between the front surface of said backrest and said part against which the second mentioned means press or the length of said bar is slightly in excess of said distance.

4. The safety device of claim 3 wherein one of said means includes a pad.

5. The safety device of claim 3 wherein one of said means includes a pad, and said bar being in two pieces which are extensibly connected together.

References Cited in the file of this patent

UNITED STATES PATENTS

| | | |
|---|---|---|
| 1,548,870 | Crafton | Aug. 11, 1925 |
| 1,748,426 | Pentland | Feb. 25, 1930 |
| 2,559,548 | Seigneur | July 3, 1951 |
| 2,575,953 | Haley et al. | Nov. 20, 1951 |
| 2,624,613 | Parmely | Jan. 6, 1953 |
| 2,625,837 | Holmes | Jan. 30, 1953 |
| 2,650,835 | Gonsett | Sept. 1, 1953 |
| 2,732,003 | Williams | Jan. 2, 1956 |
| 2,737,229 | Semar | Mar. 6, 1956 |